US006942938B2

United States Patent
Derflinger et al.

(10) Patent No.: US 6,942,938 B2
(45) Date of Patent: Sep. 13, 2005

(54) SYSTEM AND METHOD FOR COOLING A FUEL CELL ARRANGEMENT

(75) Inventors: Monika Derflinger, Neidlingen (DE); Isabel Haas, Kirchheim (DE); Hans-Frieder Walz, Bad Ueberkingen (DE)

(73) Assignee: Ballard Power Systems AG, Kirchheim-Nabern (DE)

( * ) Notice: Subject to any disclaimer, the term of this patent is extended or adjusted under 35 U.S.C. 154(b) by 600 days.

(21) Appl. No.: 10/078,266

(22) Filed: Feb. 20, 2002

(65) Prior Publication Data

US 2002/0127448 A1 Sep. 12, 2002

(30) Foreign Application Priority Data

Feb. 20, 2001 (DE) .......................................... 101 07 875

(51) Int. Cl.[7] ................................................ H01M 8/18
(52) U.S. Cl. ............................ 429/20; 429/22; 429/24; 429/26; 429/38; 429/39; 429/13; 180/65.3; 180/165
(58) Field of Search ............................... 429/13, 20, 22, 429/24, 26, 38, 39; 180/65.3, 165

(56) References Cited

U.S. PATENT DOCUMENTS

| 5,537,956 A | 7/1996 | Rennfeld et al. ......... 123/41.29 |
| 6,569,550 B2 * | 5/2003 | Khelifa ........................ 429/13 |

FOREIGN PATENT DOCUMENTS

| DE | 4327261 C1 | 10/1994 |
| DE | 198 50 829 C1 | 3/2000 |
| EP | 0842548 B1 | 8/1999 |
| EP | 0 999 078 A1 | 11/1999 |
| JP | 09320626 A | 12/1997 |

* cited by examiner

Primary Examiner—Bruce F. Bell
(74) Attorney, Agent, or Firm—Seed IP Law Group PLLC

(57) ABSTRACT

A system is used for cooling a fuel cell arrangement, particularly a fuel cell arrangement with a gas generating system in a motor vehicle. A coolant circuit for the system is connected to a cooler, a coolant delivery device, a fuel cell and at least another component to be cooled. The coolant circuit has at least two valve devices which are each assigned to the fuel cell and the at least another component to be cooled. By means of the valve devices, a flow rate of the coolant through the fuel cell or the another component to be cooled can be influenced as a function of the temperature in the region associated with the fuel cell or the another component.

36 Claims, 1 Drawing Sheet

SYSTEM AND METHOD FOR COOLING A FUEL CELL ARRANGEMENT

BACKGROUND AND SUMMARY OF THE INVENTION

This application claims the priority of German Patent Document No. 101 07 875.7, filed Feb. 20, 2001, the disclosure of which is expressly incorporated by reference herein.

The invention relates to a system and a method for cooling a fuel cell arrangement using a coolant circuit, particularly a fuel cell arrangement having a gas generating system used in a motor vehicle.

German Patent Document DE43 27 261 C1 discloses a cooling system which has a separate coolant circuit for each assembly. The separate coolant circuits are coupled by way of a heat exchanger for heating the vehicle occupant compartment of a vehicle.

However, this cooling system has the disadvantage that each of the separate coolant circuits must have all the devices of a coolant circuit, such as the coolant delivery device, the filter and the like. The costs associated with the components and the space requirement of the cooling system are therefore considerably increased.

European Patent Document EP0 842 548 B1 discloses a cooling system which is used particularly for cooling a fuel cell arrangement. To improve the cold-starting behavior of the fuel cell system or fuel cell arrangement, this cooling system has a bypass line around a cooler, which bypass line can be controlled by a valve device. As a result, the coolant circuit can be operated completely or partially without the actual cooler which results in a very rapid heating of the coolant circulating in the coolant circuit.

Japanese Patent Document JP09320626 A discloses a construction similar to that of the cooling system according to the above-mentioned European patent document. Japanese patent document also shows a bypass line around a cooler or heat exchanger which can be blocked by a valve controllable as a function of a temperature.

However, these two constructions have the disadvantage that, although they are suitable for a very rapid heating of the entire coolant circuit, only one temperature level can exist in the entire coolant circuit because all components to be cooled are supplied with the coolant at this temperature level.

It is an object of the present invention to provide a system for cooling a fuel cell arrangement, particularly a fuel cell arrangement with a gas generating system used in a motor vehicle, which is capable of supplying different components in a coolant circuit with coolant at different temperature levels.

The solution according to the invention provides at least two valve devices in the coolant circuit. Each of the valve devices can adjust the rate of flow as a function of the temperature in a region assigned to a component. Further, each of the valve devices is assigned to one of the components to be cooled, or to a group of components which are to be cooled at the same time in the operation of the fuel cell arrangement at the same or a similar temperature level, by means of a coolant circuit. As a result, different temperature levels can be achieved.

This results in the advantage that, for example, the fuel cell, at the start of the operation of the fuel cell arrangement, is cooled to a much higher temperature than the other components and auxiliary aggregates, such as electronic components, motors, pumps, or the like. The fuel cell requires a comparatively long time after the start of the fuel cell arrangement to reach the ideal operating temperature. The other components and auxiliary aggregates require the full cooling capacity at the start of operation.

In a preferred embodiment of the invention, the coolant circuit has a bypass line around each of the cooler and a component to be cooled. The valve devices can adjust the ratio of the rates of flow through the cooler or the component and through the respective bypass line.

Thus, by adjusting the ratio of the flow rates through the component to be cooled or the cooler and the respective bypass line, the temperature level in the coolant circuit can be effectively and easily controlled or regulated virtually independently. By adjusting the bypass of the component to be cooled, the temperature level in this component can be controlled or regulated independently of the remainder of the coolant circuit.

In this case, it is naturally not possible to lower the temperature level in this region, but the conventional application also provides that the corresponding components, for example, in the starting phase of the fuel cell arrangement, do not require the same high cooling capacity as in their regular operation.

Thus, by way of the first of the valve devices and the bypass line around the cooler, a basic temperature level can be adjusted for the entire coolant circuit. By way of the second valve device and the bypass line around the component to be cooled, such as the fuel cell, a higher temperature level can be adjusted. Thus, after the fuel cell arrangement is started, an ideal cooling of all components to the temperature level ideal at this time can be achieved very rapidly. A demand-oriented cooling of the respective components at any time is therefore permitted in a particularly advantageous manner.

Other objects, advantages and novel features of the present invention will become apparent from the following detailed description of the invention when considered in conjunction with the accompanying drawings.

DETAILED DESCRIPTION OF THE DRAWINGS

Figure 1:
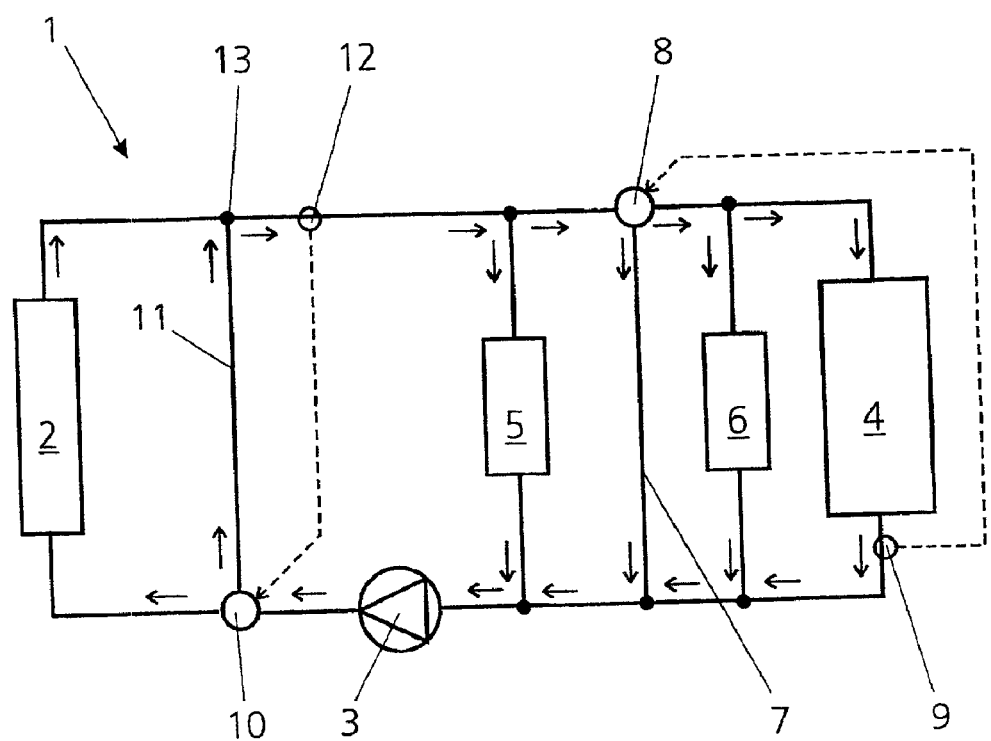
FIG. 1 is a schematic drawing of a coolant circuit of the present invention.

FIG. 1 illustrates a coolant circuit 1, which has a cooler 2, a coolant delivery device 3 and a fuel cell 4, as one of the components to be cooled. Also, other components are indicated in the coolant circuit 1 by the reference number "5". These components may particularly be auxiliary drives, electronic components to be cooled, electric machines or the like.

In this case, the component 5 may not be a single component but may designate a group of components which are arranged in the coolant circuit 1 either in parallel or in series, or a combination thereof.

Reference number "6" designates another component in the coolant circuit 1. This component 6 should be constructed particularly for the cooling of the combustion gases fed to the fuel cell 4 and will therefore be called a reformate cooler 6 hereinafter.

In the embodiment shown in FIG. 1, the ratio of the flow rates through the fuel cell 4 and the reformate cooler 6, and the bypass line 7, can be adjusted by a valve device 8. In a preferred embodiment, the valve device 8, is an electrical proportional valve.

As a result, a corresponding temperature level can be reached in the region of the fuel cell 4 and of the reformate cooler 6. The controlling or regulating of the valve device 8 is based on the data provided by a temperature sensor 9 which is placed downstream of the coolant flow through fuel cell 4. In this case, the reformate cooler 6 and the fuel cell 4 can be combined without problems to form a component or unit to be cooled because the demands on cooling capacity by these two components are the same with respect to the required temperature level and the time sequence.

In order to be able to influence the temperature level in the coolant circuit 1, another valve device 10 is provided in the region of a bypass line 11 around the cooler 2. By way of this valve device 10 the flow ratio through the cooler 2 and the bypass line 11 can be adjusted by bypassing the cooler. For ease of control, the valve device 10 can also be an electrically controllable proportional valve. Therefore, the temperature level in the coolant circuit 1 can be adjusted. For this purpose, a temperature sensor 12 is arranged in the flow 13 of the coolant from the cooler 2 and of the coolant through the bypass line 11. The temperature sensor 12 therefore determines the temperature of the combination of the two above-mentioned flows. The temperature sensed by the temperature sensor 12 is the temperature which occurs in the coolant circuit 1, and which then can only be influenced again by the other valve device 8 in the region of the fuel cell 4.

By means of the coolant circuit 1, at this temperature occurring in the region of the temperature sensor 12, in addition to the above-mentioned combination of the bypass line 7, the reformate cooler 6 and the fuel cell 4, particularly the construction of the components to be cooled, thus the electronic components, the motor and the like, are cooled.

Because the components 5 require the full cooling capacity immediately after the start of the fuel cell arrangement, the coolant can be heated up by way of the valve device 10 and the bypass line 11 very rapidly to this required temperature level. Then the demand-oriented cooling of the components 5 takes place at this particular temperature level. The fuel cell 4, which after the start of the fuel cell arrangement, requires a much longer time before it reaches its operating temperature, is supplied by way of the valve device 10 and the corresponding bypass line 7 with coolant such that a higher temperature level occurs here and the fuel cell 4 itself heats up more rapidly.

By means of the construction, a demand-oriented and thus energy-optimized cooling of the fuel cell arrangement can therefore take place with correspondingly few individual components of the coolant circuit in a very compact and efficient construction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A system for cooling a fuel cell arrangement that includes a fuel cell and at least one additional component that is to be cooled, the system comprising:
    a coolant circuit for circulating in a coolant, the coolant circuit including at least one cooler, at least one coolant delivery device, and at least two valve devices that are assigned to the fuel cell and the additional component, respectively, wherein a flow rate of the coolant through the fuel cell is influenced by one of the valves as a function of the temperature in a region assigned to the fuel cell, and a flow rate of coolant through the additional component is influenced by the other valve as a function of the temperature in a region assigned to the additional component;
    wherein the coolant circuit has a bypass line around the cooler and another bypass line around at least one of the fuel cell and the additional component, the valve devices being arranged such that they influence the ratio of the rates of flow through the cooler and the bypass line around the cooler and the ratio of the rates of flow through the at least one of the fuel cell and the additional component and the bypass line around the at least one of the fuel cell and the additional component; and
    wherein a sensor for sensing the temperature, as a function of which the valve device assigned to the bypass line around the cooler can be operated, is arrange in the flow direction of the coolant behind the flowing together of the volume flows of the coolant coming from the cooler and from the bypass line around the cooler.

2. The system according to claim 1 wherein a sensor for sensing the temperature, as a function of which the valve device assigned to a bypass line around the fuel cell and the additional component can be operated, is arranged in the flow direction of the coolant behind the fuel cell and the additional component.

3. The system according to claim 2 wherein a bypass line is constructed as a bypass around the fuel cell and further components to be cooled which directly corresponds with the fuel cell.

4. The system according the claim 1 wherein a bypass line is constructed as a bypass around the fuel cell and further components to be cooled which directly corresponds with the fuel cell.

5. The system according to claim 4 wherein the further components to be cooled which correspond directly with the fuel cell are constructed as the cooling of the combustion gas flowing into the fuel cell.

6. The system according to claim 1 wherein the additional components to be cooled are the electric and mechanical auxiliary aggregates of the fuel cell arrangement.

7. The system according to claim 1 wherein the valve devices are constructed as proportional valves.

8. The system according to claim 7 wherein the proportional valves can be operated electrically.

9. The system according to claim 1 wherein a sensor for sensing the temperature, as a function of which the valve device assigned to a bypass line around the fuel cell and the additional component can be operated, is arranged in the flow direction of the coolant behind the fuel cell and the additional component.

10. The system according to claim 1 wherein a bypass line is constructed as a bypass around the fuel cell and further components go be cooled which directly corresponds with the fuel cell.

11. A system for cooling a fuel cell arrangement that includes a fuel cell and at least one additional component that is to be cooled, the system comprising:
    a coolant circuit for circulating in a coolant, the coolant circuit including at least one cooler, at least one coolant delivery device, and at least two valve devices that are assigned to the fuel cell and the additional component, respectively, wherein a flow rate of the coolant through the fuel cell is influenced by one of the valves as a function of the temperature in a region assigned to the fuel cell, and a flow rate of coolant through the additional component is influenced by the other valve as a function of the temperature in a region assigned to the additional component;

wherein a sensor for sensing the temperature, as a function of which the valve device assigned to a bypass line around the fuel cell and the additional component can be operated, is arranged in the flow direction of the coolant behind the fuel cell and the additional component.

12. The system of claim 11 wherein the coolant circuit has a bypass line around the cooler and another bypass line around at least one of the fuel cell and the additional component, the valve devices being arranged such that they influence the ratio of the rates of flow through the cooler and the bypass line around the cooler and the ratio of the rates of flow through the at least one of the fuel cell and the additional component and the bypass line around the at least one of the fuel cell and the additional component.

13. The system of claim 12 wherein a sensor for sensing the temperature, as a function of which the valve device assigned to the bypass line around the cooler can be operated, is arrange in the flow direction of the coolant behind the flowing together of the volume flows of the coolant coming from the cooler and from the bypass line around the cooler.

14. The system according to claim 13 wherein a bypass line is constructed as a bypass around the fuel cell and further components go be cooled which directly corresponds with the fuel cell.

15. The system according to claim 11 wherein a sensor for sensing the temperature, as a function of which the valve device assigned to a bypass line around the fuel cell and the additional component can be operated, is arranged in the flow direction of the coolant behind the fuel cell and the additional component.

16. The system according to claim 15 wherein a bypass line is constructed as a bypass around the fuel cell and further components to be cooled which directly corresponds with the fuel cell.

17. The system according the claim 11 wherein a bypass line is constructed as a bypass around the fuel cell and further components to be cooled which directly corresponds with the fuel cell.

18. The system according to claim 17 wherein the further components to be cooled which correspond directly with the fuel cell are constructed as the cooling of the combustion gas flowing into the fuel cell.

19. The system according to claim 11 wherein the additional components to be cooled are the electric and mechanical auxiliary aggregates of the fuel cell arrangement.

20. The system according to claim 11 wherein the valve devices are constructed as proportional valves.

21. The system according to claim 20 wherein the proportional valves can be operated electrically.

22. A system for cooling a fuel cell arrangement that includes a fuel cell and at least one additional component that is to be cooled, the system comprising:

a coolant circuit for circulating in a coolant, the coolant circuit including at least one cooler, at least one coolant delivery device, and at least two valve devices that are assigned to the fuel cell and the additional component, respectively, wherein a flow rate of the coolant through the fuel cell is influenced by one of the valves as a function of the temperature in a region assigned to the fuel cell, and a flow rate of coolant through the additional component is influenced by the other valve as a function of the temperature in a region assigned to the additional component; and wherein a sensor for sensing the temperature, as a function of which the valve device assigned to a bypass line around the fuel cell and the additional component can be operated, is arranged in the flow direction of the coolant behind the fuel cell and the additional component.

23. The system of claim 22 wherein the coolant circuit has a bypass line around the cooler and another bypass line around at least one of the fuel cell and the additional component, the valve devices being arranged such that they influence the ratio of the rates of flow through the cooler and the bypass line around the cooler and the ratio of the rates of flow through the at least one of the fuel cell and the additional component and the bypass line around the at least one of the fuel cell and the additional component.

24. The system of claim 23 wherein a sensor for sensing the temperature, as a function of which the valve device assigned to the bypass line around the cooler can be operated, is arrange in the flow direction of the coolant behind the flowing together of the volume flows of the coolant coming from the cooler and from the bypass line around the cooler.

25. The system according to claim 24 wherein a bypass line is constructed as a bypass around the fuel cell and further components go be cooled which directly corresponds with the fuel cell.

26. The system according the claim 23 wherein a bypass line is constructed as a bypass around the fuel cell and further components to be cooled which directly corresponds with the fuel cell.

27. The system according to claim 26 wherein the further components to be cooled which correspond directly with the fuel cell are constructed as the cooling of the combustion gas flowing into the fuel cell.

28. The system according to claim 23 wherein a sensor for sensing the temperature, as a function of which the valve device assigned to a bypass line around the fuel cell and the additional component can be operated, is arranged in the flow direction of the coolant behind the fuel cell and the additional component.

29. The system according to claim 22 wherein the additional components to be cooled are the electric and mechanical auxiliary aggregates of the fuel cell arrangement.

30. The system according to claim 22 wherein the valve devices are constructed as proportional valves.

31. The system according to claim 30 wherein the proportional valves can be operated electrically.

32. The system according to claim 22 wherein a bypass line is constructed as a bypass around the fuel cell and further components to be cooled which directly corresponds with the fuel cell.

33. A fuel cell cooling system comprising:
a fuel cell;
an additional component;
a coolant circuit including a coolant delivery device, the coolant circuit connecting the fuel cell and the additional component in parallel to the coolant delivery device, the coolant circuit further including a cooler and first and second valve devices that are operatively associated with the cooler and the fuel cell, respectively, wherein the first valve device is configured to control the amount of coolant flowing through the cooler, and the second valve device is configured to control the amount of coolant flowing through the fuel cell, and wherein the coolant circuit has a first bypass line arranged in parallel with the cooler and a second bypass line arranged in parallel with the fuel cell, the first valve device adjusting the ratio of a rate of flow through the cooler and a rate of flow through the first bypass line, and the second valve device adjusting the ratio of a rate of flow through the fuel cell and a rate of flow through the second bypass line; and a first sensor for sensing the temperature of a combination of a coolant flow exiting the cooler and a coolant flow exiting the first bypass line, the first valve device adjusting the ratio of a rate of flow through the cooler and a rate of flow through the first bypass line on the basis of the temperature sensed by the first sensor.

34. A fuel cell cooling system comprising:

a fuel cell;

an additional component;

a coolant circuit including a coolant delivery device, the coolant circuit connecting the fuel cell and the additional component in parallel to the coolant delivery device, the coolant circuit further including a cooler and first and second valve devices that are operatively associated with the cooler and the fuel cell, respectively, wherein the first valve device is configured to control the amount of coolant flowing through the cooler, and the second valve device is configured to control the amount of coolant flowing through the fuel cell, and wherein the coolant circuit has a first bypass line arranged in parallel with the cooler and a second bypass line arranged in parallel with the fuel cell, the first valve device adjusting the ratio of a rate of flow through the cooler and a rate of flow through the first bypass line, and the second valve device adjusting the ratio of a rate of flow through the fuel cell and a rate of flow through the second bypass line; and a second sensor for sensing the temperature of a coolant flow exiting the fuel cell, the second valve device adjusting the ratio of a rate of flow through the fuel cell and a rate of flow through the second bypass line on the basis of the temperature sensed by the second sensor.

35. A method of cooling a fuel cell and an additional component by means of a coolant circuit including a coolant delivery device and a cooler, the coolant circuit connecting the fuel cell and the additional component in parallel to the coolant delivery device, the method comprising:

controlling the amount of coolant flowing through the cooler;

controlling the amount of coolant flowing the fuel cell, wherein controlling the amount of coolant flowing through the cooler includes controlling the ratio of a rate of flow through the cooler and a rate of flow through a first bypass line arranged in parallel with the cooler, and controlling the amount of coolant flowing through the fuel cell includes controlling the ratio of a rate of flow through the fuel cell and a rate of flow through a second bypass line arranged in parallel with the fuel cell; and sensing the temperature of a combination of a coolant flow exiting the cooler and a coolant flow exiting the first bypass line, and adjusting the ratio of a rate of flow through the cooler and a rate of flow through the first bypass line on the basis of the temperature.

36. A method of cooling a fuel cell and an additional component by means of a coolant circuit including a coolant delivery device and a cooler, the coolant circuit connecting the fuel cell and the additional component in parallel to the coolant delivery device, the method comprising:

controlling the amount of coolant flowing through the cooler;

controlling the amount of coolant flowing the fuel cell, wherein controlling the amount of coolant flowing through the cooler includes controlling the ratio of a rate of flow through the cooler and a rate of flow through a first bypass line arranged in parallel with the cooler, and controlling the amount of coolant flowing through the fuel cell includes controlling the ratio of a rate of flow through the fuel cell and a rate of flow through a second bypass line arranged in parallel with the fuel cell; and sensing the temperature of a coolant flow exiting the fuel cell, and adjusting the ratio of a rate of flow through the fuel cell and a rate of flow through the second bypass line on the basis of the temperature.

* * * * *